(12) United States Patent
Hafner et al.

(10) Patent No.: US 10,962,090 B2
(45) Date of Patent: Mar. 30, 2021

(54) GEAR TRAIN UNIT AND ARRANGEMENT FOR A STAMPING PRESS

(71) Applicant: Bruderer AG, Frasnacht (CH)

(72) Inventors: Josef Thomas Hafner, Rorschacherberg (CH); Pascal Hardmeier, Arbon (CH)

(73) Assignee: BRUDERER AG, Frasnacht (CH)

( * ) Notice: Subject to any disclaimer, the term of this patent is extended or adjusted under 35 U.S.C. 154(b) by 1364 days.

(21) Appl. No.: 15/034,910

(22) PCT Filed: Nov. 6, 2013

(86) PCT No.: PCT/CH2013/000193
§ 371 (c)(1),
(2) Date: May 6, 2016

(87) PCT Pub. No.: WO2015/066822
PCT Pub. Date: May 14, 2015

(65) Prior Publication Data
US 2016/0273620 A1 Sep. 22, 2016

(51) Int. Cl.
*F16H 3/64* (2006.01)
*B30B 1/26* (2006.01)
*F16H 37/02* (2006.01)

(52) U.S. Cl.
CPC .............. *F16H 3/64* (2013.01); *B30B 1/266* (2013.01); *F16H 37/02* (2013.01); *F16H 2200/0034* (2013.01); *F16H 2200/201* (2013.01)

(58) Field of Classification Search
None
See application file for complete search history.

(56) References Cited

U.S. PATENT DOCUMENTS

| 3,021,726 A | 2/1962 | Chambers et al. |
| 3,115,204 A * | 12/1963 | Dence .................... B60T 1/062 180/10 |

(Continued)

FOREIGN PATENT DOCUMENTS

| DE | 1153583 B | 8/1963 |
| EP | 2375102 A1 | 10/2011 |

(Continued)

OTHER PUBLICATIONS

Reply to Search Opinion EP13788881 (Year: 2015).*
International Search Report for corresponding PCT/CH2013/000193 application dated Jul. 24, 2014.

*Primary Examiner* — Dirk Wright
(74) *Attorney, Agent, or Firm* — McCormick, Paulding & Huber PLLC

(57) ABSTRACT

The invention relates to a gear train unit, comprising a plurality of planetary gear train stages, which are connected one after the other and which each comprise a ring gear, a sun gear, and a plurality of planet gears supported on a planet carrier, wherein the sun gear of each following planetary gear train stage is formed by the planet carrier of the preceding planetary gear train stage. The gear train unit comprises a driving element, which forms the sun gear of the first planetary gear train stage, and an output element, which forms the planet carrier of the last of the gear planetary gear train stages connected one after the other. The driving element is supported by means of first bearings arranged in the region of ends of the driving element, in such a way that the driving element can rotate about a longitudinal axis of the driving element, and at least some of the planet carriers of the planetary gear train stages are supported on the driving element in the region between the first bearings by means of bearings. The invention makes it possible to provide a gear train unit having a plurality of planetary gear (Continued)

train stages connected one after the other that is economical, extremely robust, and very compact and that additionally can transmit very high power.

22 Claims, 4 Drawing Sheets

(56) References Cited

U.S. PATENT DOCUMENTS

| | | | | |
|---|---|---|---|---|
| 3,598,188 | A * | 8/1971 | Foster | E21B 3/04 |
| | | | | 173/165 |
| 6,676,557 | B2 * | 1/2004 | Milbourne | B23Q 5/142 |
| | | | | 173/178 |
| 8,727,931 | B2 * | 5/2014 | Hafner | F16H 3/64 |
| | | | | 475/299 |
| 2020/0087123 | A1 * | 3/2020 | Snider | B66D 5/00 |

FOREIGN PATENT DOCUMENTS

| | | | |
|---|---|---|---|
| FR | 1249299 | A | 12/1960 |
| JP | 2004194530 | A | 7/2004 |
| WO | 9119916 | A1 | 12/1991 |

* cited by examiner

GEAR TRAIN UNIT AND ARRANGEMENT FOR A STAMPING PRESS

CROSS REFERENCE TO RELATED APPLICATION

Applicant hereby claims priority benefits under U.S.C. § 119 from International Patent Application Serial No. PCT/CH2013/000193, filed on Nov. 6, 2013, the contents of which are incorporated by reference herein.

TECHNICAL FIELD OF THE INVENTION

The present invention relates to a gear train unit with a plurality of planetary gear train stages which are connected one after the other as well as an arrangement comprising such a gear train unit according to the preambles of the independent claims.

Gear train stages with a plurality of planetary gear train stages connected one after the other are used in cases where extremely high torques are required at low rotational speeds.

A gear train stage according to this type, with three planetary gear train stages for driving punching presses is known from EP 2 375 102 A1. However, this gear train unit has the disadvantage that different components of the gear, e.g. the driving element, are subjected to extreme mechanical stress during operation due to the construction of the gear, thus making it necessary to use very expensive components made of highly rigid materials and leading to an unnecessary limitation of the powers which can be transmitted with the gear.

SUMMARY OF THE INVENTION

It is therefore the objective to provide a gear train unit with multiple planetary gear train stages connected one after the other, which doesn't have or at least partially avoids the disadvantages of the prior art mentioned above.

This objective is reached by the gear train unit according to claim 1. According to it, a first aspect of the invention relates to a gear train unit with a plurality of planetary gear train stages connected one after the other, which is suitable for connecting a driving motor, preferably an electric motor or a hydraulic motor, with a working machine, preferably with a automated punching press or with a punching press, respectively.

The planetary gear train stages of the gear train unit comprise each a ring gear, a sun gear and a plurality of planet gears supported on a planet carrier, wherein the sun gear of each following planetary gear train stage in force direction is formed by the planet carrier of the preceding planetary gear train stage or is connected or connectable with said planet carrier in a torsionally rigid manner in rotational direction of this planet carrier.

Furthermore, the gear train unit comprises a driving element which forms the sun gear of the first planetary gear train stage in force direction or which is connected or connectable with said sun gear in a torsionally rigid manner in rotational direction of this sun gear, for driving the sun gear.

The gear train unit also comprises an output element which forms the planet carrier of the last of the planetary gear train stages connected one after the other or which is connected or connectable with said planet carrier in a torsionally rigid manner in rotational direction of the latter, for driving a component or a machine, respectively, which has to be driven by the gear train unit.

The driving element is supported in the region of its both ends in a rotatable manner about its longitudinal axis by means of first bearings according to the claims, which are preferably formed as roller bearings, wherein a part of the planet carriers or all planet carriers of the planetary gear train stages is or are supported on the driving element between these first bearings by means of bearings, particularly by means of roller bearings.

The invention makes it possible to provide a gear train unit with multiple planetary gear train stages connected one after the other, which is non-expensive, extremely robust and built very compact and additionally which can transfer very high powers.

Preferably, the driving element is supported with the first bearings in a statically determinate manner. In this way it is possible to reach that the bearing stress remains controllable at all times also in case of deformations, e.g. bending, of the driving element.

It is furthermore preferred that the driving element is supported with each of the first bearings at a component which is stationary during operation. In this way a particularly stable support of the driving element is possible, particularly when the fixed components at which the driving element is supported by the first bearings, is part of a contiguous fixed structure of the gear train unit, which is preferred.

It is furthermore also advantageous that the driving element is formed at one end for coupling to a driving motor and the stationary component, at which the driving element is supported in the area of this end with one of the first bearings according to the claims, is formed for carrying the driving motor. In this way it is possible to form motor/gear train units with the gear train unit according to the invention, which are extremely compact and have a high torsional stiffness.

In a preferred embodiment of the gear train unit the section of the driving element, on which a part of the planet carriers or all planet carriers are supported, transmits the torque for driving the sun gear of the first planetary gear train stage during operation as intended. In this way it is possible to provide a gear train unit according to the invention in a simple way, in case of which the driving element and the output element are accessible from the same side of the gear.

It is also preferred that the sun gear of the first planetary gear train stage of the gear train unit is arranged in the area of an end of the driving element. Thereby it is also preferred that at least a part of the first bearing according to the claims arranged in the area of this end of the driving element is arranged inside the sun gear of the first planetary gear train stage. These measures further promote a compact construction of the gear train unit.

It is furthermore advantageous that the first bearing according to the claims, which is arranged in the area of the end of the driving element, in the area of which the first sun gear of the first planetary gear train stage is arranged, is formed as fixed bearing, preferably with a cylindrical roller bearing. This type of construction promote an inexpensive and robust supporting of the driving element.

In yet a further preferred embodiment of the gear train unit the section of the driving element, on which the planet carriers are arranged, preferably together with the sun gear of the first planetary gear train stage, is formed as a one-piece component. Such an embodiment of the driving element is particularly robust and helps reducing the number of components.

In yet a further preferred embodiment the gear train unit is surrounded by a drum-type housing which forms the driving element of the gear train unit. This housing is supported by second bearings according to the claims, particularly roller bearings, arranged in the area of the ends of its drum shape, in a rotatable manner about an axis extending in the center of its drum shape. In this way it is possible to build robust and very compact gear train units according to the invention, which can additionally also be integrated in existing machine components, e.g. in the belt wheel of the belt drive of a press.

Preferably, the drum-type housing with the two bearings according to the claims is supported in a statically determinate way. In this way the bearing forces are controllable in all operation states.

It is further preferred that the drum-type housing is supported directly or indirectly on the driving element with at least one of the second bearings according to the claims, preferably with both second bearings according to the claims.

Alternatively or additionally it is also preferred that the drum-type housing is supported in each case at a component which is fixed during operation with at least one of the second bearings according to the claims, preferably with both second bearings.

Depending on the construction concept the one or the other variant or a combination of both variants can be particularly advantageous.

In the latter variant it is preferred for the embodiments of the gear train unit, in case of which the fixed components, at which the driving element is supported with the first bearings according to the claims, which are part of a contiguous fixed structure of the gear train unit, that the fixed component or components are part of the supporting structure at which the driving element is supported with the first bearings according to the claims. In this way a simpler and more stable build of the supporting structure is promoted, particularly when the supporting structure encompasses the supporting structure in a U-shaped manner, which is preferred.

Furthermore it is preferred for the embodiments of the gear train unit, for which it is surrounded by a drum-shaped housing which forms the driving element of the gear train unit, that the drum-shaped housing has at its outer circumference a running surface for a V-belt or a flat belt, or a toothing for a toothed belt, a chain or a gear wheel, for coupling to a corresponding driving element of a work machine. I.e. the drum-shaped housing which surrounds the gear train unit entirely or at least partially, rotates in operation about the other gear components and is formed in such a way that its rotation motion can be transmitted on a drive shaft of a work machine by means of suitable transmission means like flat belts, V-belts or toothed belts, chains or toothings.

In yet a further preferred embodiment of the gear train unit it is preferred that the planetary gear train stages are arranged inside an interior space of the gear which is sealed towards the outside, which is connectable with a lubricating oil circuit via supply lines and discharge lines leading to the outside. In this way a targeted lubricating oil supply of all critical lubrication points is possible and the gear can also be additionally cooled by the lubricating oil circuit, such that it can be dimensioned and used also for transmission of very high powers.

Thereby it is furthermore preferred for embodiments in case of which the driving element is supported with each of the first bearings according to the claims at a component that is fixed during operation, that the supply and discharge lines are guided through these components which are fixed during operation or run through these components, respectively. In this way a secure supply and discharge of the lubricating oil can be reached without additional components.

In yet a further preferred embodiment the gear train unit is switchable in such a way that a first or a second transmission ratio is selectively settable. The term "switchable" gear train unit is understood in this context as a gear train unit the transmission ratio of which can be changed without construction changes or interventions, respectively, preferably without tools by actuating switching means, e.g. a switching lever or an actuating button. Such gear train units make it possible to drive work machines which require for only a short time very high process force and which draw it from a flywheel in an inexpensive way with a motor dimensioned for normal operation with flywheel in such a way that they can be operated in normal operation or in a slow operating mode for initializing and testing the working process, wherein process forces which are comparable to the normal operation, during which the flywheel is active, can be supplied for the slow operating mode, during which the flywheel is not active or only active to little extent. In this way it is e.g. possible to drive punching presses or punching machines with crank drives and flywheels, respectively, with such embodiments of the gear train unit, in such a way that they can be operated with full punching force in normal operation with high punching frequencies as well as in a slow operation for initializing and testing punching tools.

Thereby it is preferred that the ability to switch the gear train unit is given in such a way that the ring gears of the planetary gear train stages can selectively be coupled with a component which is fixed during operation or with the driving element, for selectively retaining or rotating the latter together with the driving element. In this way the gear can selectively be closed (ring gears coupled to driving element), such that a transmission of 1:1 results without generating energy losses in the gear, or operated as intended as step-up or step-down gear unit, respectively (ring gears coupled to fixed components).

A second aspect of the invention relates to an arrangement with a gear train unit according to the first aspect of the invention, further comprising the following components:

a) a punching press or an automated punching press, respectively, with a crank drive or an eccentric drive for transforming the rotational motion of a drive shaft of the punching press into the punching motion of the tool and with a flywheel connectable or connected with the drive shaft; and b) a drive motor for driving the drive shaft of the punching press.

Thereby, the driving element of the gear train unit is connected or is connectable with the drive motor via a preferably switchable coupling and the output element of the gear train unit is connected or is connectable via a preferably switchable coupling with the drive shaft of the punching press or the automated punching press, respectively, or with the flywheel.

The build of such arrangements is a preferred use of the gear train unit according to the invention.

In a preferred embodiment the arrangement comprises a gear train unit, which is formed in a switchable way, in such a way that a first or a second transmission ration can be selectively set. The drive motor and the transmission ratios of the gear train unit are dimensioned in such a way that the maximum punching force which can be generated at the plunger of the punch press in operation, with the transmission ratio of the gear train unit at which the slower rotation of the drive shaft results (creep mode operation), is equal to or greater than the maximum punching force which can be generated at the plunger of the punch press in operation, with the transmission ratio of the gear train unit at which the faster rotation of the drive shaft results (normal operation). The drive motor and the transmission ratios are therefore chosen in such a way that the torque of the drive motor, which is increased due to the step-down gear during creep mode operation is equal to or greater than the sum of the torque of the drive motor and the torque provided by the flywheel for the punching process in normal operation mode. In this way it is possible to operate the punching press or the automated punching press with full punch force in normal operation mode with high punching frequencies as well as in creep mode operation for initializing and testing punch tools.

In a further preferred embodiment the arrangement comprises a gear train unit surrounded by the drum-type housing which forms the output element of the gear train unit. The flywheel is formed by the housing of the gear train unit, resulting in the advantage that the installation can be executed in a particularly compact way.

BRIEF DESCRIPTION OF THE DRAWINGS

Further preferred embodiments of the invention result from the dependent claims and from the now following description by means of the drawings. It is therefore shown in:

DETAILED DESCRIPTION

Figure 1:
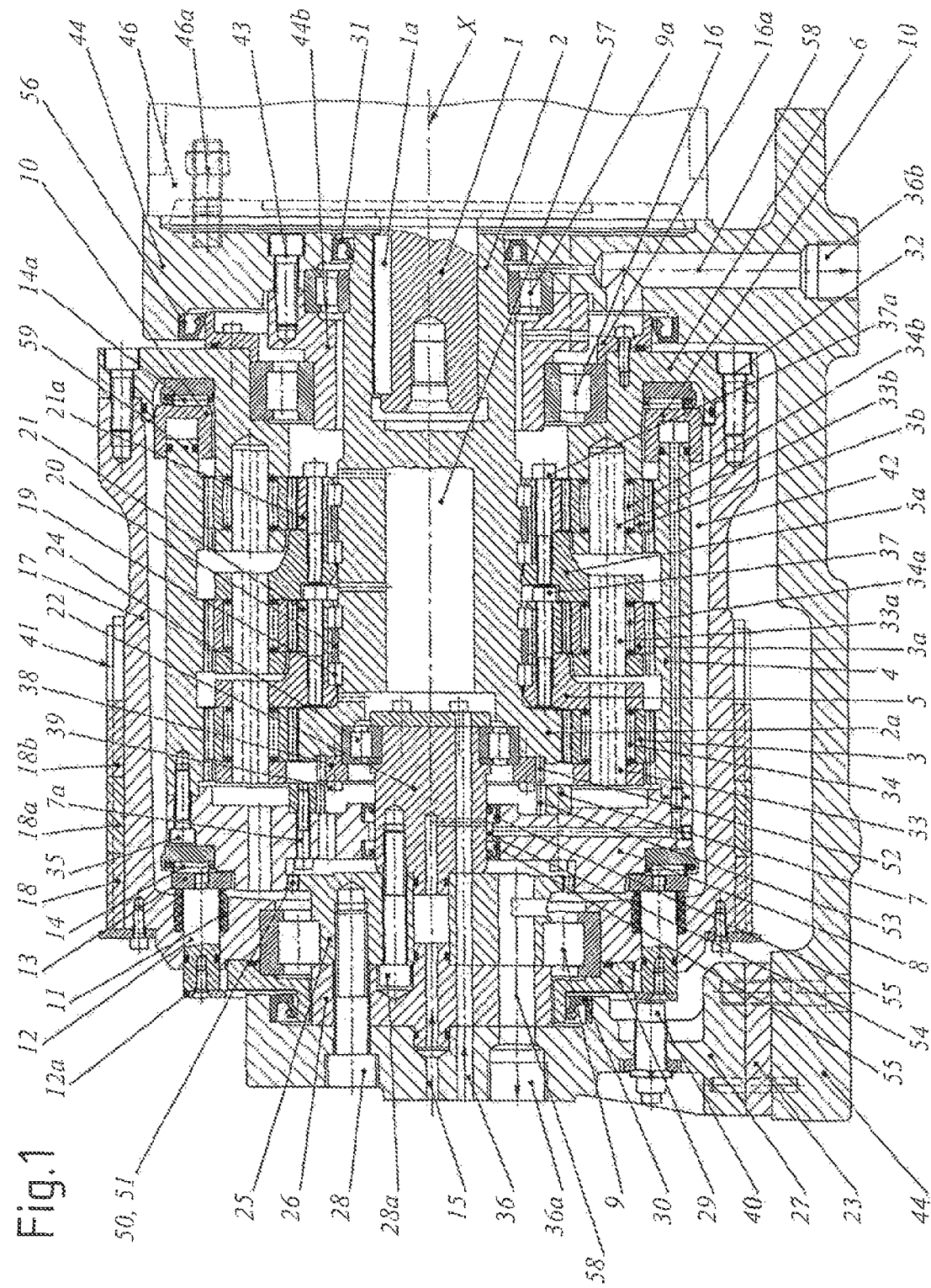
FIG. 1 a longitudinal section through a switchable gear train unit according to the invention in a first switching state.
Figure 2:
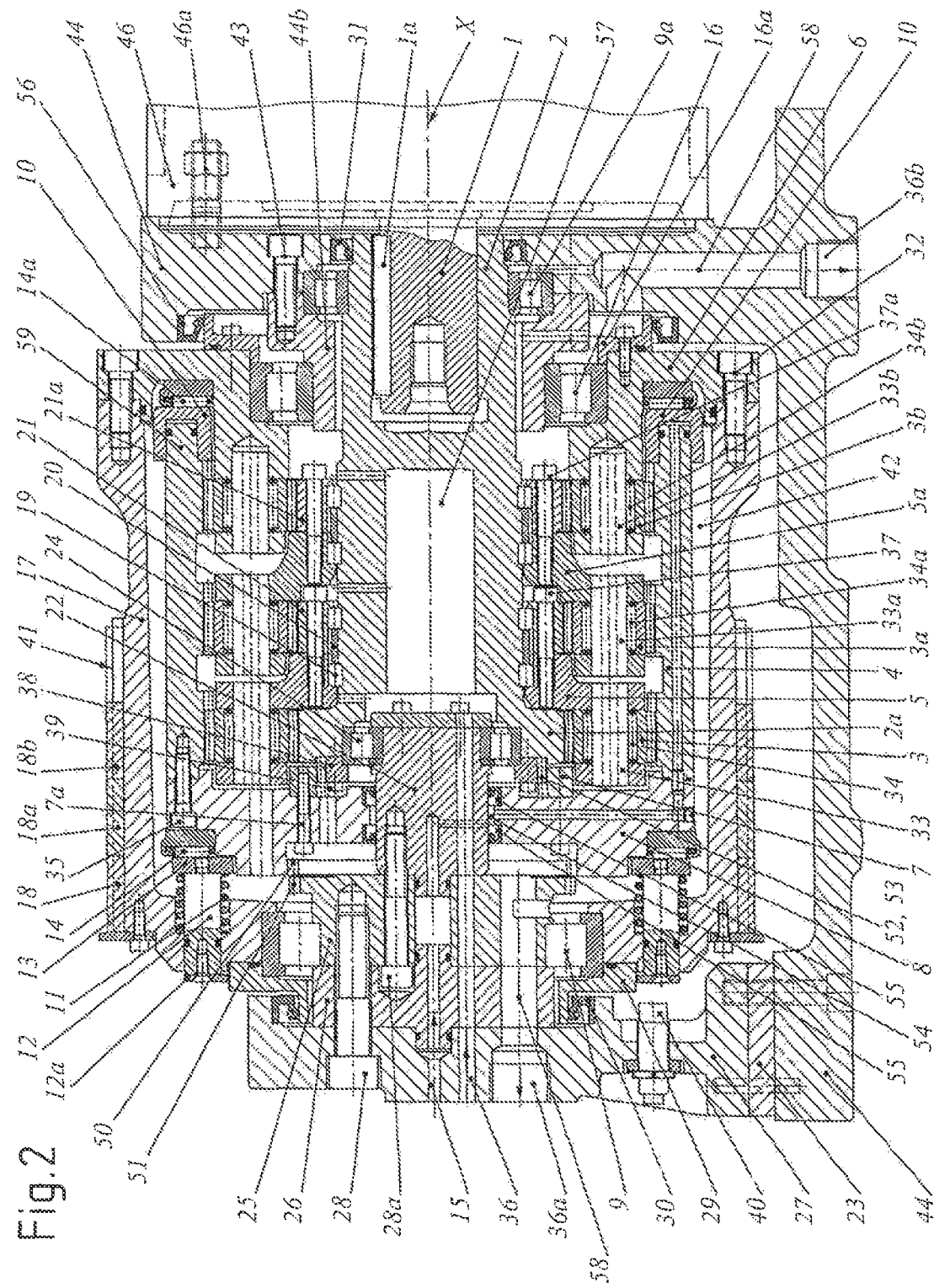
FIG. 2 a longitudinal section through the gear train unit of FIG. 1 in a second switching state.

FIGS. 1 and 2 show a switchable gear train unit according to the invention with three planetary gear train stages connected one after the other in vertical longitudinal section, once in a switching state in which the gear is effective (FIG. 1) and once in a state in which the gear is locked (FIG. 2), i.e. in which the transmission ratio is 1:1.

Figure 3:
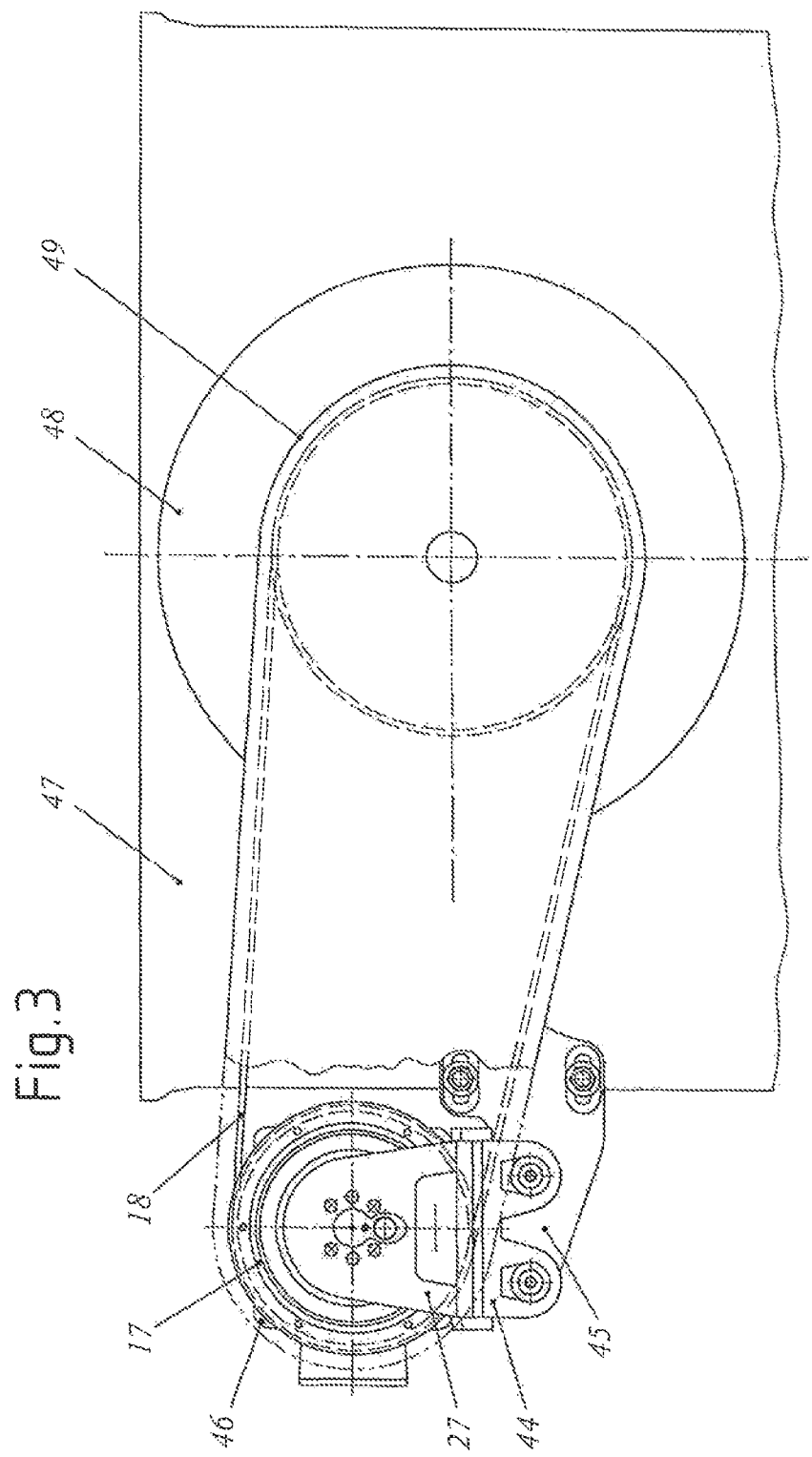
FIG. 3 a part of a rear view of an arrangement according to the invention with the gear train unit of FIG. 1.
Figure 4:
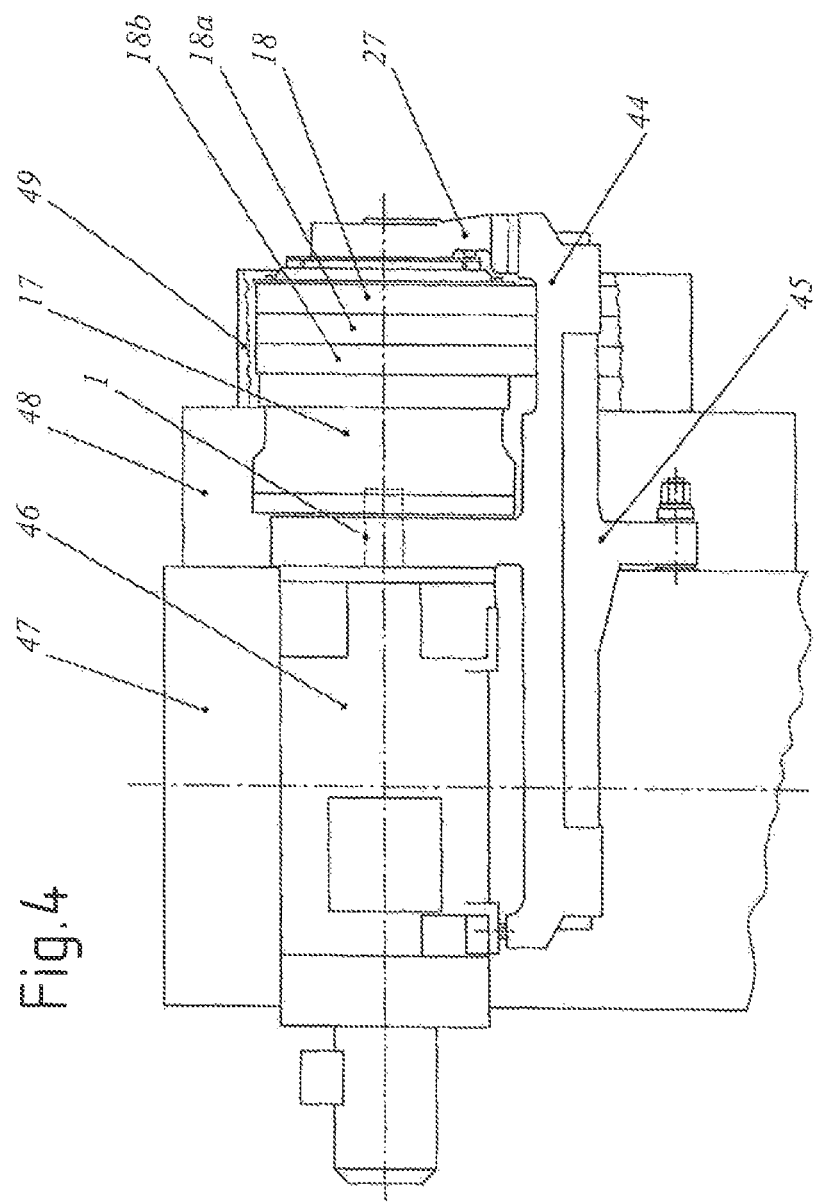
FIG. 4 a part of a side view of the arrangement of FIG. 3.

The illustrations according to FIGS. 3 and 4 show an arrangement according to the invention with the gear train unit of FIGS. 1 and 2 and a punching press 47 driven by it, once in a partial rear view (FIG. 3) with the so-called main drive and one in a partial side view (FIG. 4) with the motor mount.

As can be seen, the gear train unit has a central driving element 2 which is coupled at one of its ends to a horizontally lying shaft 1 of an electric motor 46 (shown in FIGS. 3 and 4) and which forms at its other end the sun gear 2a of the first planetary gear train stage. When operated as intended the electric motor 46 drives, via fitted key 1a, the driving element 2 and via the latter the sun gear 2a of the first planetary gear train stage. The driving element 2 is supported radially and axially on an axial arrangement 22, 25, 26, which is fixed in operation, with a roller bearing 24 in the area of the sun gear 2a formed by it at its left end. The fixed axial arrangement 22, 25, 26 is supported by a continuous rigid supporting structure 23, 27, 44 which encompasses the drum-shaped housing 6, 17 of the gear train unit in a U-shaped way. At its other end, the driving element 2 is supported only in radial direction with a roller bearing 9a at a component 44 of the rigid supporting structure 23, 27, 44. In this way the driving element 2 is supported at its ends in a statically determined way.

In the first planetary gear train stage of the gear train unit there are four first planetary gears 3 engaging the first sun gear 2a and a pot-shaped ring gear arrangement 4, 8 forming the internally toothed ring gears for all three gear stages. The four first planet gears 3 are able to rotate by means of bolt 33 and needle rollers 34 and are supported on both sides in a first planet carrier 5.

This planet carrier 5 transfers the increased torque via screws 37 to the sun gear 21 of the second planetary gear train stage. The planet carrier 5 with the second sun gear 21 mounted to it for driving the second planetary gear train stage is supported on the driving element 2 by means of cylindrical rollers 19 and a cage 20.

In the second planetary gear train stage five second planet gears 3a engage the second sun gear 21 and a second internally toothed ring gear of the pot-shaped ring gear arrangement 4, 8. The five second planet gears 3a are supported in the second ring gear and transfer the torque to a second planet carrier 5a by means of bolt 33a and needle rollers 34a, supported on both sides. Just like the planet carrier 5 of the first planet gear train stage the latter further transfers the increased torque via screws 37a to the sun gear 21 of the next, namely the third planetary gear train stage. The second planet carrier 5a with the third sun gear 21a mounted to it for driving the third planetary gear train stage is supported on the driving element 2 by means of cylindrical rollers and a cage, in identical way like in case of the first planet gear train stage.

Eight third planet gears 3b are built in the third planet gear train stage, which are supported in a third ring gear of the pot-shaped ring gear arrangement 4, 8 and which transmit their torque via further bolts 33b and needle rollers 34b in a non-flyingly supported manner to a third planet carrier 6. This carrier 6 is a part of the drum-shaped housing 6, 17 of the gear train unit, which drives three toothed belts 18, 18a, 18b as driving element 6, 17 according to the claims.

In this way the torque of the electric motor 46 in the state shown in FIG. 1 can be brought to a very high level in multiple steps. In this case the pot-shaped ring gear arrangement 4, 8, which enters at its right end, with a ring piston 59, a pneumatic ring cylinder 10 impinged with pressurized air, is pushed to the left by the overpressure in the ring cylinder 10, where it engages with an internal toothing 50 formed at its left end an external toothing 51 formed at the fixed, non-rotatable bearing pin 25. In this way the ring gear arrangement 4, 8 is coupled in this switching state to the fixed bearing pin 25 in a rotatably fixed manner.

A pressure ring 13 engages at the left end of the ring gear arrangement 4, 8, ensuring with a number of screw-compression springs 11 that the ring gear arrangement 4, 8 is pushed into the position according to FIG. 2 (basic position) in case of pressureless switching of the ring cylinder 10. Thereby, the internal toothing 50 of the ring gear arrangement 4, 8 is disengaged from the external toothing 51 of the bearing pin 25 and subsequently an internal toothing 53 of a toothed ring 7 attached to the pot-shaped ring gear arrangement 4, 8 is engaged with an external toothing 52 of a toothed ring 38 attached on the left frontal side of the driving element 2, such that the ring gear arrangement 4, 8 is coupled in a rotatory fixed manner to the driving element 2. In this gear position the first sun gear 2a is on the one hand coupled to the ring gear arrangement 4 directly via the mutually engaged toothed rings 38, 7, and on the other hand it is connected to the four first planet gears 3 which also engage the first ring gear of the ring gear arrangement 4. In this way the entire gear train unit is blocked or short-circuited, respectively, and the housing 17 forming the belt wheel assumes the same rotational speed like the shaft 1 of the electromotor 46 (transmission ratio 1:1).

In the gear position shown in FIG. 1 the ring gear arrangement 4, 8, and accordingly the ring gears of the three gear train stages formed by it, are idle and the planet gear is as a whole actively rotating slowly. This means that the toothed belt 18, 18a, 18b and the housing 17 forming the toothed belt wheel rotate in the current example almost 19 times slower that the motor shaft 1 and a relative motion is created with respect to the idle ring gears.

This is the reason why a slide ring 14a is arranged on the side of the ring cylinder and a slide ring 14 is arranged of the spring side. These slide rings 14, 14a ensure a wear-free sliding even under the influence of the contact pressure of the ring cylinder 10 and of the springs 11. The springs 11 are guided on guiding pins 12 such that the individual springs 11 are positioned on the front ring 13.

The pressurized air for impinging the ring cylinder 10 with the aim to precipitate the switching state shown in FIG. 1 is guided from a supply port 15 in a component 27 of the fixed supporting structure 23, 27, 44, via supply lines connected to it into the components of the fixed shaft arrangement 22, 25, 26 and via supply lines into the components of the pot-shaped ring gear arrangement 4, 8 into the ring cylinder 10. Thereby, the transfer of the shaft arrangement 22, 25, 26, which is fixed in operation, on the ring gear arrangement 4, 8, which rotates in operation according to FIG. 2, is carried out via an annular gap 54 formed between them, which is sealed by rotating gaskets 55.

The drum-shaped housing 6, 17 is axially and radially supported at its left end on the fixed shaft arrangement 22, 25, 26 with a cylindrical roller bearing 9 which is secured in axial direction by a ring-shaped cover 29 inside a receiving opening in the housing 17. A shaft seal 30, arranged between the cover 29 and the component 27 supporting the fixed shaft arrangement 22, 25, 26, closes the interior space 42 of the drum-shaped housing 6, 17 on the left side in an oil-tight manner towards the exterior.

At its other end the drum-shaped housing 6, 17 is supported only radially with a cylindrical roller bearing 16 on a supporting socket 44b, which is tightly screwed to a main component 44 of the fixed, rigid supporting structure 23, 27, 44 and which at the same time serves to keep the right bearing 9a of the driving element 2 axially in a receiving opening in the supporting structure 44. The bearing 16 is supported in a receiving opening in the component 6 of the drum-shaped housing 6, 17, where it is supported axially with an attachment ring 16a, which component forms the planet gear 6 of the last planetary gear train stage.

Shaft seals 56, 31 arranged between the attachment ring 16a and the main component 44 of the fixed supporting structure 23, 27, 44, as well as between the driving element 2 and this main component 44, close the interior space 42 of the drum-shaped housing 6, 17 on the right side in an oil-tight manner towards the exterior.

The lubricating oil for the gear train unit is supplied from a supply port 36 in a component 27 of the fixed supporting structure 23, 27, 44, via supply lines in the components of the fixed shaft arrangement 22, 25, 26 connected thereto, into a central bore 57 in the driving element 2, from where it is supplied to the individual planet gear train stages via multiple radial bores in the driving element 2. The lubricating oil return flow takes place via discharge lines 58 in the fixed components 25, 26, 27 and 44 with attributed return ports 36a, 36b.

As can be seen in FIGS. 3 and 4, the electric motor 46 is attached on a console 44 with the gear train unit, which console is attached with rubber dampers on a motor carrier 45, which is itself attached to the upper part of the press. The motor carrier 45 can be shifted to the sides in order to pretension the belts 18, 18a, 18b. The flywheel of the punching press is arranged below a casing 48 and a belt protection 49 avoids access to the belts 18, 18a, 18b.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A gear train unit for coupling a drive motor with an automatic punching press or with a punching press, respectively, with a plurality of planetary gear train stages connected one after the other, which each comprise a ring gear, a sun gear and a plurality of planet gears supported on a planet carrier, wherein the sun gear of each following planetary gear train stage is formed by the planet carrier of the preceding planetary gear train stage or is connected or connectable with said planet carrier in a torsionally rigid manner in rotational direction of the latter,
with a driving element which forms the sun gear of the first planetary gear train stage or which is connected or connectable with said sun gear in a torsionally rigid manner in rotational direction of the latter,
and with an output element which forms the planet carrier of the last of the planetary gear train stages connected one after the other, or which is connected or connectable with said planet carrier in a torsionally rigid manner in rotational direction of the latter,
wherein the gear train unit is surrounded by a drum-type housing which forms the output element of the gear train unit and which is supported by second bearings, arranged in the area of the ends of its drum shape, in a rotatable manner about an axis extending in the center of its drum shape,
wherein the driving element is supported by means of first bearings, arranged in the region of its ends, in a rotatable manner about its longitudinal axis and wherein at least a part of the planet carriers of the planetary gear train stages is supported on the driving element in the region between the first bearings by means of bearings, and
wherein the driving element is supported with the first bearings in each case at a component which is stationary during operation.

2. The gear train unit according to claim 1, wherein the fixed components, to which the driving element is supported with the first bearings, are part of a contiguous rigid supporting structure of the gear train unit.

3. The gear train unit according to claim 1, wherein the driving element is supported with the first bearings in a statically determinate manner.

4. The gear train unit according to claim 1, wherein the driving element is formed at one end for coupling to a driving motor and wherein the stationary component, at which the driving element is supported with one of the first bearings in the area of said end, is formed for carrying the driving motor.

5. The gear train unit according to claim 1, wherein the section of the driving element on which the planet carriers are supported transmits the torque for driving the sun gear of the first planetary gear stage during operation as intended.

6. The gear train unit according to claim 1, wherein the sun gear of the first planetary gear train stage is arranged in the area of an end of the driving element.

7. The gear train unit according to claim 6, wherein at least a part of the first bearing arranged in the area of this said end of the driving element is arranged inside the sun gear of the first planetary gear train stage.

8. The gear train unit according to claim 6, wherein the first bearing which is arranged in the area of the end of the driving element, in the area of which the first sun gear of the first planetary gear train stage is arranged, is formed as fixed bearing, particularly with a cylindrical roller bearing.

9. The gear train unit according to claim 1, wherein the section of the driving element on which the planet carriers are arranged, particularly together with the sun gear of the first planetary gear train stage, is formed as a one-piece component.

10. The gear train unit according to claim 1, wherein the drum-type housing with the second bearings is supported in a statically determinate way.

11. The gear train unit according to claim 1, wherein the drum-type housing is supported directly or indirectly on the driving element with at least one of the second bearings.

12. The gear train unit according to claim 1, wherein the drum-type housing is supported in each case at a component which is fixed during operation with at least one of the second bearings.

13. The gear train unit according to claim 2 and according to claim 12, wherein the fixed component or components, at which the drum-type housing is supported with the second bearings, are part of the supporting structure at which the driving element is supported with the first bearings.

14. The gear train unit according to claim 13, wherein the supporting structure encompasses the drum-type housing in a U-shape.

15. The gear train unit according to claim 1, wherein the drum-type housing has at its outer circumference a running surface for a V-belt or a flat belt, or a toothing for a toothed belt, a chain or a gear wheel, for coupling to a corresponding driving element of a work machine.

16. The gear train unit according to claim 1, wherein the planetary gear train stages are arranged inside an interior space of the gear sealed towards the outside, which is connectable with a lubricating oil circuit via supply lines and discharge lines leading to the outside.

17. The gear train unit according to claim 16, wherein the supply and discharge lines are guided through the components which are fixed during operation, at which the driving element is supported with the first bearings.

18. The gear train unit according to claim 1, wherein the gear train unit is switchable in such a way that a first or a second transmission ratio is selectively settable.

19. The gear train unit according to claim 18, wherein the ability to switch is given in such a way that the ring gears of the planetary gear train stages can selectively be coupled with a component which is fixed during operation or with the driving element, for selectively retaining or rotating the latter together with the driving element.

20. An arrangement comprising a gear train unit according to claim 1, and further comprising:
   a) a punch press with a crank drive or an eccentric drive for transforming the rotational motion of a drive shaft of the punch press into the punching motion of the tool and with a flywheel connectable or connected with the drive shaft; and
   b) a drive motor for driving the drive shaft of the punch press;
   wherein the driving element of the gear train unit is connected or connectable via a coupling with the drive motor and the output element of the gear train unit is connected or is connectable via a coupling with the drive shaft of the punch press or the flywheel.

21. The arrangement according to claim 20 wherein the gear train unit is switchable in such a way that a first or a second transmission ratio is selectively settable, and wherein the drive motor and the transmission ratios of the gear train unit are dimensioned in such a way that the maximum punching force which can be generated at the plunger of the punch press in operation with the transmission ratio of the gear train unit at which the slower rotation of the drive shaft results, is equal to or greater than the maximum punching force which can be generated at the plunger of the punch press in operation with the transmission ratio of the gear train unit at which the faster rotation of the drive shaft results.

22. The arrangement according to claim 20, wherein the flywheel is formed by the drum-type housing of the gear train unit.

* * * * *